United States Patent Office 3,270,057
Patented August 30, 1966

3,270,057
CATALYTIC HYDROGENATION OF NITRO AROMATIC COMPOUNDS TO PRODUCE THE CORRESPONDING AMINO COMPOUNDS
Edward Vincent Cooke and Harry John Thurlow, Manchester, England, assignors to Imperial Chemical Industries Limited, London, England, a corporation of Great Britain
No Drawing. Filed Oct. 5, 1964, Ser. No. 401,643
Claims priority, application Great Britain, Sept. 24, 1962, 36,191/62
19 Claims. (Cl. 260—580)

This invention relates to a process for the manufacture of aniline and other primary monoamino mononuclear aromatic compounds.

The present application is a continuation-in-part of application Serial No. 230,686, filed October 15, 1962, now abandoned.

It has already been proposed in U.S. Patent No. 2,292,879 to carry out the liquid phase hydrogenation of aromatic nitro, nitroso, nitrosamino, diazo, azo, azoxy, hydrazo or betahydroxylamino compounds, the process being carried out under conditions such that the finely divided catalyst is maintained uniformly in suspension in the liquid, and substantially all water formed in the reaction is removed from the reaction zone. In that specification it is also disclosed that the activity of the catalyst is enhanced when the amine product resulting from the reaction is employed as solvent for the nitro compound or other reactant, and when the amine is present in preponderating concentration in the solution.

We have now found that for the continuous hydrogenation of nitrobenzene and other mononuclear aromatic hydrocarbons in the liquid phase, it is advantageous to employ the amine product i.e. aniline or other corresponding monoamino mononuclear aromatic compound, as the solvent in a proportion not less than 95% by weight of the liquid phase, and preferably to maintain the concentration of amine product in the liquid phase as near 100% as possible by controlling the process variables, especially the rate of addition of the nitro compound. Under these conditions it is found possible to operate at or near the boiling point at the prevailing pressure and to perform the hydrogenation rapidly and safely. The reaction is strongly exothermic but by operating at or near the boiling point some or all of the heat of reaction can be conveniently dissipated by allowing the reaction mixture to evaporate.

The boiling point of the amine product is above that of water and accordingly water formed in the reaction is always very rapidly removed from the reaction vessel in the effluent vapours. When the vapours are cooled and condensed, the condensate separates into two layers—a water layer and an amine product layer, from which the product is recovered. If the rate of vaporisation of the reaction mixture exceeds the rate of formation of the reaction products a proportion of the amine product is returned to the reaction vessel to maintain steady conditions therein. The rate of return of amine product to the reaction vessel then corresponds to the difference between the rate of removal of amine product by evaporation and its rate of formation. Employing a fine degree of control the rate of removal of amine product as vapour may be adjusted to correspond exactly to its rate of formation and in this case it is not necessary to return to the reaction vessel any of the amine product removed as vapour therefrom. However, for simplicity of operation, it is preferred to evaporate the reaction product at a greater rate than the rate of its formation and return a proportion of amine product to the reaction vessel as condensate.

As well as dissipating the heat of reaction by allowing the reaction mixture to evaporate, heat of reaction may also be removed by contacting the reaction mixture with a cooled surface, for example by providing the reaction vessel with cooling coils, or with a jacket through which a coolant may be circulated or by circulating, the reaction mixture through heat exchangers. By such means the hydrogenation can be kept under excellent control, and it is preferred to remove up to 65% of the heat of reaction in this way.

The hydrogenation can be conducted conveniently at atmospheric pressure but if desired pressures up to 10 atmospheres can be employed. Usually pressures of not more than 5 atmospheres are preferred.

Thus according to the present invention we provide a continuous process for the manufacture of primary monoamino mononuclear aromatic compounds by liquid phase catalysed hydrogenation of mononitro mononuclear aromatic hydrocarbons characterised in that the concentration of primary monoamino nuclear compound in the liquid phase is not less than 95% by weight and in that the hydrogenation is conducted at the apparent boiling point of the reaction mixture at a pressure not exceeding 10 atmospheres, at least some of the heat of reaction being removed by allowing the reaction mixture to evaporate, the vapours being condensed, water separated from the condensate, and when necessary, sufficient of the condensed primary monoamino mononuclear aromatic compound being returned to the reaction vessel to maintain steady conditions therein.

The phrase "at the apparent boiling point" is used to take into account the apparent drop in the boiling point which occurs due to passage of gas through the reaction mixture and removal of heat by transfer from the reaction vessel, for example, through the use of external cooling. Thus, when the gas flow is reduced, the operating temperature tends to rise and approaches nearer to the true boiling point of the reaction mixture, and when the gas flow is increased the operating temperature falls.

Surprisingly, the impurity content of the amine product is quite small and may be reduced further by control of the excess of hydrogen over the amount equivalent to the nitro compound feed and/or by having present in the liquid reaction mixture a small proportion of an organic base having a stronger basicity than the amine product as defined in terms of pKα value; for example an alkanolamine such as monoethanolamine, diethanolamine or triethanolamine. Other suitable bases are for example 1,4-diazabicyclo(2,2,2)-octane, nicotine quinoline, or tetraethylammonium hydroxide. Especially suitable bases are the alkanolamines containing up to about 14 carbon atoms. The bases are preferably added in amount of from 20 to 200 parts by weight per 100 parts by weight of catalyst.

Under steady conditions of operation the rate at which the nitro compound is fed into the reaction mixture is usually adjusted to a level up to about 10% lower than the practical limit of reaction rate for the conditions selected such as temperature, agitation speed, gas feed and catalyst concentration.

The process is suitable for the continuous hydrogenation of mononitro mononuclear aromatic hydrocarbons such as nitrobenzene, nitrotoluenes and nitroxylenes with formation of the corresponding amines viz, aniline, toluidines, and xylidenes, and is particularly valuable for the manufacture of aniline. Conditions for the manufacture of aniline which have been found especially suitable are:

| Pressure: | Temperature |
|---|---|
| Atmospheric | 160–175° C. |
| 2 atmospheres absolute | 175–190° C. |
| 3 atmospheres absolute | 190–215° C. |

Catalysts suitable for use in the reaction are the usual hydrogenation catalysts, for example Raney nickel, palladium on charcoal or supported nickel, cobalt or copper. Especially suitable is nickel-on-kieselguhr or nickel on chemically prepared silica. From 1 to 20 parts by weight of catalyst for 100 parts by weight of amine product in the reaction mixture are preferred proportions. The catalyst which is in finely divided form is suspended in the liquid reaction medium by stirring and by passage of hydrogen gas through the medium. Any excess of hydrogen which passes out of the reaction vessel with the effluent vapours is separated from the vapours when they are condensed and the gas can then be recirculated and combined with fresh hydrogen as feed to the reactor. If desired a proportion of inert gas can be admixed with the hydrogen feed to increase agitation of the reaction mixture and to give an added cooling effect. Alternatively impure hydrogen such as that obtained by petroleum cracking and containing from 2 to 10% of inert impurities may be used, provided it is substantially free from catalyst poisons.

By the use of the process of the invention, amine products of excellent purity are obtained in high yield, and the process may be operated over long periods without appreciable loss of catalyst activity.

The invention is illustrated but not limited by the following examples in which parts and percentages are by weight.

Example 1

A vessel which is fitted with an agitator capable of dispersing gas at high rates is charged with aniline (which must not contain more than a very low concentration of sulphur compounds and any other poisons for nickel catalysts). For every 100 parts by weight of aniline 5 parts of nickel-on-kieselguhr catalyst and 5 parts of triethanolamine are charged.

The charge is heated to 165° C. and a stream of hydrogen equivalent to 0.05 ft.$^3$/hr. measured at N.T.P. for each 1 lb. of aniline is fed through a pipe delivering below the agitator. A nitrobenzene feed is started at a rate of 4 parts per 100 parts aniline.

Aniline and water distil from the reactor and as the reaction is strongly exothermic an excess of aniline over the amount produced is evaporated. The vapours pass to a condenser and the condensate which forms two layers flows to a binary separator. An amount of the wet aniline layer corresponding to the nitrobenzene feed is run off to storage and the remainder recycled to the reactor. The wet aniline product is a water-white or slightly yellow clear oil containing approximately 4.5% water and small traces of cyclohexylamine, cyclohexanone, cyclohexylidene aniline and other materals.

About 5% of the hydrogen is purged off continuously and the remainder of the excess is recycled back to the reactor. The reactor temperature remains at 165–170° C. so long as the feeds are maintained.

In continuous operation about 800 parts of aniline are produced per part of supported nickel catalyst.

Example 2

The above process is repeated but no addition of triethanolamine is made to the reaction mixture.

The aniline produced, although of good quality, has a slightly higher content of impurities and is rather more difficult to separate from the aqueous layer formed when vapours leaving the reaction vessel are condensed.

Example 3

A vessel of 5 ft. diameter, which is fitted with a jacket through which a coolant fluid can be circulated and with an agitator capable of dispersing gas at high rates, is charged with aniline (which must not contain more than a very low concentration of sulphur compounds and any other poisons for nickel catalysts). For every 100 parts by weight of aniline 5 parts of nickel-on-kieselguhr catalyst and 5 parts of triethanolamine are charged. The charge is heated to 180° C. and hydrogen is passed in to raise the total pressure to 15 pounds/sq. in. gauge. A stream of hydrogen equivalent to 130 ft.$^3$/hr. measured at N.T.P. for each 100 lb. of aniline in the reactor is maintained. A nitrobenzene feed of 9.5 parts per hour by weight per 100 parts of aniline in the reactor is started and maintained continuously. 65% of the heat of reaction (i.e. approximately 910 centigrade heat units/lb. aniline made) is removed from the reactor by circulating cooling water through the jacket so that substantially only the amount of aniline formed in the reactor together with the water produced leaves the reactor as vapour. The vapour is cooled and the aniline and water layers are separated.

Aniline of similar purity to that described in Example 1 is obtained.

Example 4

900 parts by weight of aniline made from nitrobenzene having a low sulphur content are charged into a vessel fitted with an agitator, a heated jacket and a reflux condenser maintained at about 100° C. to return part of the evaporated aniline to the reactor and connected to a total condenser to condense the rest of the vapours, mainly aniline water. 45 parts by weight nickel-on-kieselguhr catalyst (5% on weight of aniline) and an amount of one of the organic bases listed below equal to the weight of catalyst are also charged. The vessel is heated to 140–150° C. to start the reaction and low-sulphur nitrobenzene is added continuously at a rate corresponding to about 7½% by weight of the aniline charge per hour. Simultaneously hydrogen, is fed into the vessel through a pipe delivering to the bottom at a rate of 90 volumes 1 hr./volume aniline measured at atmospheric pressure and ambient temperature. The water produced in the reaction is boiled off together with some aniline and the volatile by-products. The excess aniline is condensed in the reflux condenser and returned to the reactor. The water vapour and an amount of aniline equivalent to the added nitrobenzene is condensed at the total condenser. The condensate separates into two layers, an aqueous upper layer and an aniline lower layer. The aniline layer is collected and subjected to analysis for cyclohexylamine using gas liquid chromatography.

Comparative results obtained with various organic base additives are given in the following table together with the results of a hydrogenation performed under identical conditions except for the absence of an added organic base.

| Alkanolamine | Cyclohexylamine content of product—average over 8 hours, percent |
|---|---|
| No addition | 4.9 |
| Mono-ethanolamine | 0.06 |
| Diethanolamine | 0.06 |
| Triethanolamine | 0.06 |
| Mono-isopropanolamine | 0.17 |
| Tri-isopropanolamine | 1.02 |
| 3-hydroxy-propylamine | 0.24 |
| N-dodecylethanolamine | 2.0 |
| Tetraethylammonium hydroxide | 1.41 |
| 1,4-diazabicyclo-(2,2,2)-octane | 1.0 |
| Nicotine | 0.8 |
| Quinoline | 1.4 |

Example 5

A vessel similar to that referred to in Example 3 is charged with o-toluidine (which must not contain more than a very low concentration of sulphur compounds or any other poisons for nickel catalysts—preferably not more than 10–50 parts per million of sulphur). For every 100 parts by weight of o-toluidine, 5 parts of nickel-on-kieselguhr catalyst are charged.

The charge is heated to 185° C. and a stream of hydrogen equivalent to 75 ft.$^3$/hr. measured at N.T.P for each 100 lbs. of o-toluidine is fed to the reactor. A nitrotoluene feed is started at the rate of 5 parts by weight per hour per 100 parts o-toluidine in the reactor.

Toluidine and water distil from the reactor in the same way as aniline and water are described as distilling in Example 1. The condenser temperature is controlled so that the condensate emerges at about 80° C. It passes to a separator which is also maintained at 80° C.

The wet toluidine product contains approximately 4% of water and small traces of impurities similar to those found in the aniline product of Examples 1, 2, 3. It is treated in a similar manner to the aniline in that any excess over that produced is recycled to the reactor.

*Example 6*

The process of Example 5 is repeated except the p-toluidine is charged to the reactor in a molten state (M.P. 43° C.) and molten p-nitrotoluene is fed in continuously. The product after separation is maintained in the fluid state by suitable temperature control whilst flowing through the plant.

What we claim is:

1. In a continuous process for the production of a primary monoamino mononuclear aromatic compound selected from the group consisting of aniline, toluidines and xylidenes by the liquid phase catalytic hydrogenation of the corresponding mononitro mononuclear aromatic hydrocarbon, the improvement which comprises providing a liquid reaction medium containing at least 95% by weight of said monoamino compound and having the hydrogenation catalyst suspended therein, introducing said mononitro hydrocarbon and hydrogen into said reaction medium to hydrogenate said mononitro hydrocarbon and form said monoamino compound while maintaining said medium at substantially the boiling point thereof and at a pressure in the range of atmospheric up to 10 atmospheres, removing at least part of the heat of reaction by allowing vaporization of the reaction mixture, maintaining the weight percent of monoamino compound present in said reaction medium at not less than 95%, and withdrawing from the system an amount of monoamino compound corresponding essentially to an amount equivalent to the moles of mononitro hydrocarbon introduced into the reaction medium.

2. Process according to claim 1 wherein the concentration of the primary monoamino mononuclear aromatic compound in the liquid phase is maintained as near to 100% by weight as possible.

3. Process according to claim 1 wherein heat of reaction is removed by evaporation of the reaction mixture and by cooling of the reaction mixture.

4. Process according to claim 1 wherein the rate of evaporation of the reaction products exceeds their rate of formation, and the evaporated monoamino compound is returned at a rate corresponding to the difference between the rate of removal of monoamino compound by evaporation and its rate of formation.

5. Process according to claim 1 wherein the rate of evaporation of the monoamino compound corresponds to its rate of formation.

6. Process according to claim 1 wherein the catalyst is a supported nickel catalyst.

7. Process according to claim 1 wherein a proportion of an organic base is added to the reaction mixture, said organic base having a pKα value greater than that of the monoamino compound and said base containing up to about 14 carbon atoms.

8. Process according to claim 7 wherein a proportion of an alkanolamine is added to the reaction mixture.

9. Process according to claim 8 wherein the alkanolamine is monoethanolamine, diethanolamine or triethanolamine.

10. Process according to claim 1 wherein the primary monoamino mononuclear aromatic compound is aniline.

11. Process according to claim 1 wherein hydrogen is employed in an amount in excess of the stoichiometric amount required for said hydrogenation.

12. In a continuous process for the production of aniline by liquid phase catalytic hydrogenation of nitrobenzene, the improvement which comprises providing a liquid reaction medium containing at least 95% by weight of aniline and having the hydrogenation catalyst suspended therein, introducing nitrobenzene and hydrogen into said reaction medium to hydrogenate said nitrobenzene and form aniline while maintaining said medium at substantially the boiling point thereof and at a pressure in the range of atmospheric up to 10 atmospheres, removing at least part of the heat of reaction by allowing vaporization of the reaction mixture to give a vaporized product consisting essentially of aniline and water, condensing the vaporized product to form a condensate having an aniline phase and a water phase, separating said water phase from said aniline phase, and then recycling a part of the condensed aniline to said reaction medium in an amount sufficient to maintain the weight percent of aniline present in said medium at not less than 95% and withdrawing from the system the rest of the condensed aniline corresponding essentially to an amount equivalent to the moles of nitrobenzene introduced into the reaction medium.

13. The process of claim 12 wherein the reaction medium includes about 5% of triethanolamine based on the weight of aniline in said medium; about 5% excess hydrogen is used, over and above that necessary to convert the nitrobenzene to aniline; the catalyst comprises nickel supported on kieselguhr, in an amount within the range of about 1 to 20% based on the weight of aniline in said reaction medium and the reaction medium is kept at a temperature of 160–175° C. and atmospheric pressure and the rate of aniline evaporation is greater than the rate of formation.

14. Process according to claim 12 wherein the concentration of aniline in the liquid phase is maintained near 100% by weight.

15. Process according to claim 14 wherein the pressure is atmospheric pressure and the temperature is 160–175° C.

16. Process according to claim 15 wherein the catalyst is nickel supported on kieselguhr.

17. Process according to claim 16 wherein a proportion of an alkanolamine is added to the reaction mixture.

18. Process according to claim 17 wherein an excess of hydrogen is employed over that required for the hydrogenation and the excess is recirculated to the reaction vessel.

19. In a continuous process for the production of monoamino compound selected from the group consisting of aniline, toluidines and xylidenes by the liquid phase catalytic hydrogenation of the corresponding mononitro compound, the improvement which comprises providing a liquid reaction medium containing at least 95% by weight of said monoamino compound and having the hydrogenation catalyst suspended therein, introducing said mononitro compound and hydrogen into said reaction medium to hydrogenate said mononitro compound and form said monoamino compound while maintaining said medium at substantially the boiling point thereof and at a pressure in the range of atmospheric up to 10 atmospheres, removing at least part of the heat of reaction by allowing vaporization of the reaction mixture to give a vaporized product consisting essentially of said monoamino compound and water, condensing the vaporized product to form a condensate having a monoamino compound phase and a water phase, separating said water phase from said monoamino compound phase, then recycling a part of the condensed monoamino compound to said reaction medium in an amount sufficient to maintain the weight percent of monoamino compound present in said medium at not less than 95%, and withdrawing from the system the rest of the condensed monoamino compound corresponding essentially to an amount equivalent to the moles of mononitro compound introduced into the reaction medium.

References Cited by the Examiner
UNITED STATES PATENTS 2,292,879   8/1942   Kise _____ 260—580
2,894,036   7/1959   Graham _____ 260—580

OTHER REFERENCES

Miall: A New Dictionary of Chemistry, 1961, 3rd ed., page 20.

CHARLES B. PARKER, *Primary Examiner.*

DALE R. MAHANAND, R. L. RAYMOND,
*Assistant Examiners.*